UNITED STATES PATENT OFFICE.

JAMES A. PALMER, OF JAMAICA PLAIN, MASSACHUSETTS.

LIQUID POLISH FOR METALLIC AND OTHER SURFACES.

1,425,046. Specification of Letters Patent. Patented Aug. 8, 1922.

No Drawing. Application filed April 26, 1922. Serial No. 556,751.

*To all whom it may concern:*

Be it known that I, JAMES A. PALMER, a citizen of the United States, and a resident of Jamaica Plain, in the county of Suffolk and Commonwealth of Massachusetts, have invented an Improvement in Liquid Polishes for Metallic and Other Surfaces, of which the following description is a specification.

This invention relates to liquid polishes for surfaces in general and more particularly to liquid polishes for metal surfaces, such as stove polish.

The invention has for its object among other things, to provide a polish for metallic surfaces; a polish that shall be easily and quickly applied; a polish having a substantial and elastic body thereby assuring proper "filling" and uniformity of application in creating an even, smooth and glossy surface; a polish that shall be non-inflammable and yet shall evaporate sufficiently rapidly to enable it to be used on cold surfaces, and yet shall not evaporate so rapidly as to leave hardened brushmarks or a streaky or uneven surface after the polishing operation.

I have found that these desirable results can be obtained by using as a vehicle for the polish a mineral oil, such as commercial petroleum oil, for example, having a flash point of 100° F. or more, mixed with a lesser amount of tetrachloride of carbon.

My polish will also comprise a suitable filler, preferably graphite, a suitable black coloring matter, preferably carbon black, and a suitable adhesive to cause the polish to adhere to the surface. For the latter purpose I preferably use gilsonite, although any other suitable bituminous substance may be employed, for example a bitumen or a pyrobitumen, including the native and pyrogenous asphalts and the asphaltites, gilsonite, glance pitch and grahamite. The term asphaltum is hereinafter employed in the general or industrial sense and includes both native and pyrogenous asphalts, and the asphaltites above mentioned.

I preferably use in weight from about 8% to about 33% of graphite, from about 2% to about 7% of carbon black, from about 2% to about 5% of gilsonite, from about 12% to about 61% of petroleum oil having a flash point of 100° F. or over and from about 11% to about 57% of carbon tetrachloride. As one example of a formula which I have found to give extremely good results, I use in weight about 21.5% of graphite, about 4.5% of carbon black, about 4% of gilsonite, about 36% of petroleum oil having a flash point of 100° F. or over, and about 34% of carbon tetrachloride.

In making up a batch of my liquid polish in accordance with this formula, I preferably first dissolve about 4.5 lbs. of commercial gilsonite in about 3 gallons of commercial petroleum oil by heating the mixture in a suitable container until the solution is complete. I then add about 25 lbs. of graphite and about 5 lbs. of carbon black. The mixture thus obtained is then thoroughly mixed, which may be best accomplished in any suitable rotary mixer of well-known construction. I thus obtain a smooth paste and to this I then gradually add about 3 more gallons of commercial petroleum oil and about 3 gallons of carbon tetrachloride while still continuing the mixing operation. When the mixing is complete the product is ready for use and can be put up in bottles or other suitable containers and sealed, in which condition it may be preserved indefinitely.

As already stated, the graphite acts as a filler to fill in the inequalities in the metal and thus produce a smooth surface to receive the gloss, which is thus increased. The carbon black adds to the black color, and owing to its lightness, keeps the heavier ingredients of the mixture, such as the graphite, in suspension, or where, after long standing, settling of the heavier ingredients has taken place, the carbon black assists in restoring the suspension of the heavier ingredients on shaking, so that less effort is required for that purpose. The gilsonite besides acting as an adhesive to cause the polish to adhere to the surface to be polished, also assists in maintaining the heavier ingredients in suspension. Being a gum it adds elasticity to the mixture and thereby insures a more uniform distribution in the application of the polish. Furthermore, this substance gives off no offensive odor when the stove or other metallic surface is heated, as is the case with most adhesives heretofore used in similar compounds. The carbon tetrachloride adds to the drying quality and increases the non-inflammability of the product. The petroleum oil constitutes the vehicle, and having a flash point of 100° F. or over, acts in combination with the tetrachloride to render the polish non-inflammable. As already stated, my polish can be used on a cold surface, this being due to the presence of the tetrachloride, which by its ready evaporation furthers evaporation of the petroleum oil, which otherwise would require a long time to evaporate, so that it could be used only on hot surfaces. It is inadvisable to use more tetrachloride or a mineral oil of a lower flash point than 100° F., as otherwise the mixture would be inflammable and the evaporation would be too quick so that streaks or brushmarks would be formed in polishing and a smooth surface would be impossible to obtain.

The polish is best applied by placing a small amount of the liquid upon a cloth or brush and then applying it to the surface to be polished by rubbing the surface with the cloth or brush having the polish thereon. In this way a beautifully evenly polished surface will be obtained having a deep black luster. Any other satisfactory mode of application may however be used.

My polish is characterized by perfect adhesion to the surface to be polished, thereby preventing rust in the case of metallic surfaces.

If applied with a cloth-pad, the perfect drying qualities of this polish make it possible for the user to rub it dry with the same part of the cloth, thereby working the heavy body of the polish into the pores and crevices of the iron and creating a beautifully smooth surface.

An adhering surface thus built will be maintained very economically since only very little of the polish is then necessary to refresh the lustre from time to time.

The labor of producing and maintaining that smooth and brilliant surface is enormously reduced by the use of this polish.

The combination of petroleum oil having a flash point of 100° F. and over, and carbon tetrachloride will cause the polish to dry on a perfectly cold stove, giving the best results, as the slower evaporation thus ensured gives greater opportunity for the filler to work into the pores or inequalities of the surface, thus producing a smoother surface, which thus shows a higher gloss or luster.

Claims.

1. A liquid polish for metallic and other surfaces, comprising a filler; a coloring matter; an adhesive; a mineral oil having a flash point of 100° F. or over, and tetrachloride of carbon, the content of tetrachloride of carbon being less than the content of mineral oil.

2. A liquid polish for metallic and other surfaces, comprising in weight from about 8% to about 33% of graphite; from about 2% to about 7% of carbon black; from about 2% to about 5% gilsonite; from about 12% to about 61% of petroleum oil having a flash point of 100° F. or over, and from about 11% to about 57% of carbon tetrachloride.

3. A liquid polish for metallic and other surfaces, comprising in weight about 21.5% of graphite; about 4.5% of carbon black; about 4% of gilsonite; about 36% of petroleum oil having a flash point of 100° F. or over, and about 34% of carbon tetrachloride.

4. A liquid polish for metallic and other surfaces, comprising about 25 lbs. of graphite; about 5 lbs. of carbon black; about 4.5 lbs. of gilsonite; about 3 gallons of carbon tetrachloride, and about 6 gallons of petroleum oil having a flash point of 100° F. or more.

5. A process or method of making a liquid polish for metallic and other surfaces, which comprises dissolving about 4% of gilsonite in about 18% of commercial petroleum oil with the application of heat; adding about 21.5% of graphite and about 4.5% of carbon black; thoroughly mixing the mixture thus obtained while adding about 18% more of commercial petroleum oil and about 34% of carbon tetrachloride.

6. A liquid polish for metallic and other surfaces, comprising a mineral oil having a flash point of 100° F. or over, tetrachloride of carbon and gilsonite.

7. A liquid polish for metallic and other surfaces, comprising a mineral oil having a flash point of 100° F. or over, tetrachloride of carbon and gilsonite, the content of tetrachloride of carbon being less than the content of mineral oil.

8. A liquid polish for metallic and other surfaces, comprising a mineral oil having a flash point of 100° F. or over, tetrachloride of carbon and asphaltum.

9. A liquid polish for metallic and other surfaces, comprising a mineral oil having a flash point of 100° F. or over, tetrachloride of carbon and asphaltum, the content of tetrachloride of carbon being less than the content of mineral oil.

10. A liquid polish for metallic and other surfaces, including carbon black, graphite and gilsonite suspended in a suitable vehicle.

11. A liquid polish for metallic and other surfaces, including a vehicle comprising a mineral oil having a flash point of 100° F. or over and tetrachloride of carbon.

12. A liquid polish for metallic and other surfaces, comprising graphite and a vehicle of mineral oil having a flash point of 100° F. or over and tetrachloride of carbon.

13. A liquid polish for metallic and other surfaces, comprising a mineral oil having a flash point of 100° F. or over, tetrachloride of carbon and a bitumen.

14. A liquid polish for metallic and other surfaces, comprising a mineral oil having a flash point of 100° F. or over, tetrachloride of carbon and a bitumen, the content of tetrachloride of carbon being less than the content of mineral oil.

In testimony whereof, I have signed my name to this specification.

JAMES A. PALMER.